(12) United States Patent
Sato

(10) Patent No.: US 6,985,184 B2
(45) Date of Patent: Jan. 10, 2006

(54) ELECTRONIC CAMERA

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 713 days.

(21) Appl. No.: 10/076,329

(22) Filed: Feb. 19, 2002

(65) Prior Publication Data

US 2003/0020822 A1 Jan. 30, 2003

(30) Foreign Application Priority Data

Mar. 29, 2001 (JP) .............................. 2001-094961

(51) Int. Cl.
*H04N 5/225* (2006.01)

(52) U.S. Cl. ...................... 348/340; 359/648; 359/764; 359/746

(58) Field of Classification Search ................ 348/335, 348/374, 340, 345, 375, 717; 250/208.1; 257/701; 359/648, 691, 708, 714, 715, 717, 359/746, 747, 764, 766, 793
See application file for complete search history.

(56) References Cited

U.S. PATENT DOCUMENTS

| | | | |
|---|---|---|---|
| 4,231,636 A * | 11/1980 | Abe | ........................... 359/648 |
| 5,347,398 A * | 9/1994 | Debize | ....................... 359/648 |
| 5,502,597 A * | 3/1996 | Estelle et al. | ................ 359/793 |
| 5,604,639 A * | 2/1997 | Bietry et al. | ................. 359/717 |
| 5,880,777 A | 3/1999 | Savoye et al. | |
| 6,285,400 B1 * | 9/2001 | Hokari | ........................ 348/374 |
| 6,486,917 B2 * | 11/2002 | Iwasaki | ....................... 348/375 |
| 6,525,886 B1 * | 2/2003 | Lewis | ........................ 359/691 |
| 6,618,093 B1 * | 9/2003 | Levy | ........................... 348/374 |
| 6,627,865 B1 * | 9/2003 | Hamilton et al. | ......... 250/208.1 |
| 6,791,072 B1 * | 9/2004 | Prabhu | .................... 250/208.1 |
| 6,849,843 B2 * | 2/2005 | Ansorge et al. | .......... 250/208.1 |
| 2002/0048091 A1 * | 4/2002 | Sato | ........................... 359/708 |
| 2002/0050637 A1 * | 5/2002 | Sekiya | ........................ 257/701 |

* cited by examiner

*Primary Examiner*—David L. Ometz
*Assistant Examiner*—Brian Jelinek
(74) *Attorney, Agent, or Firm*—Arnold International; Bruce Y. Arnold

(57) ABSTRACT

An improved electronic camera is disclosed which enables higher light-detecting efficiency of the electronic image pick-up device and reduces focusing errors in the periphery of the image field. The present invention arranges the detectors of an optical pick-up device on a surface that is non-planar. In this way, the surface of the optical pick-up device can be made to correspond with the actual image surface of the camera optical system. Further, each detecting element of the optical pick-up device is illuminated by light rays that are normal to its surface, thereby increasing the light detecting efficiency of the optical pick-up device in the periphery of the image field while decreasing focusing errors that occur at the periphery of the image field.

11 Claims, 4 Drawing Sheets

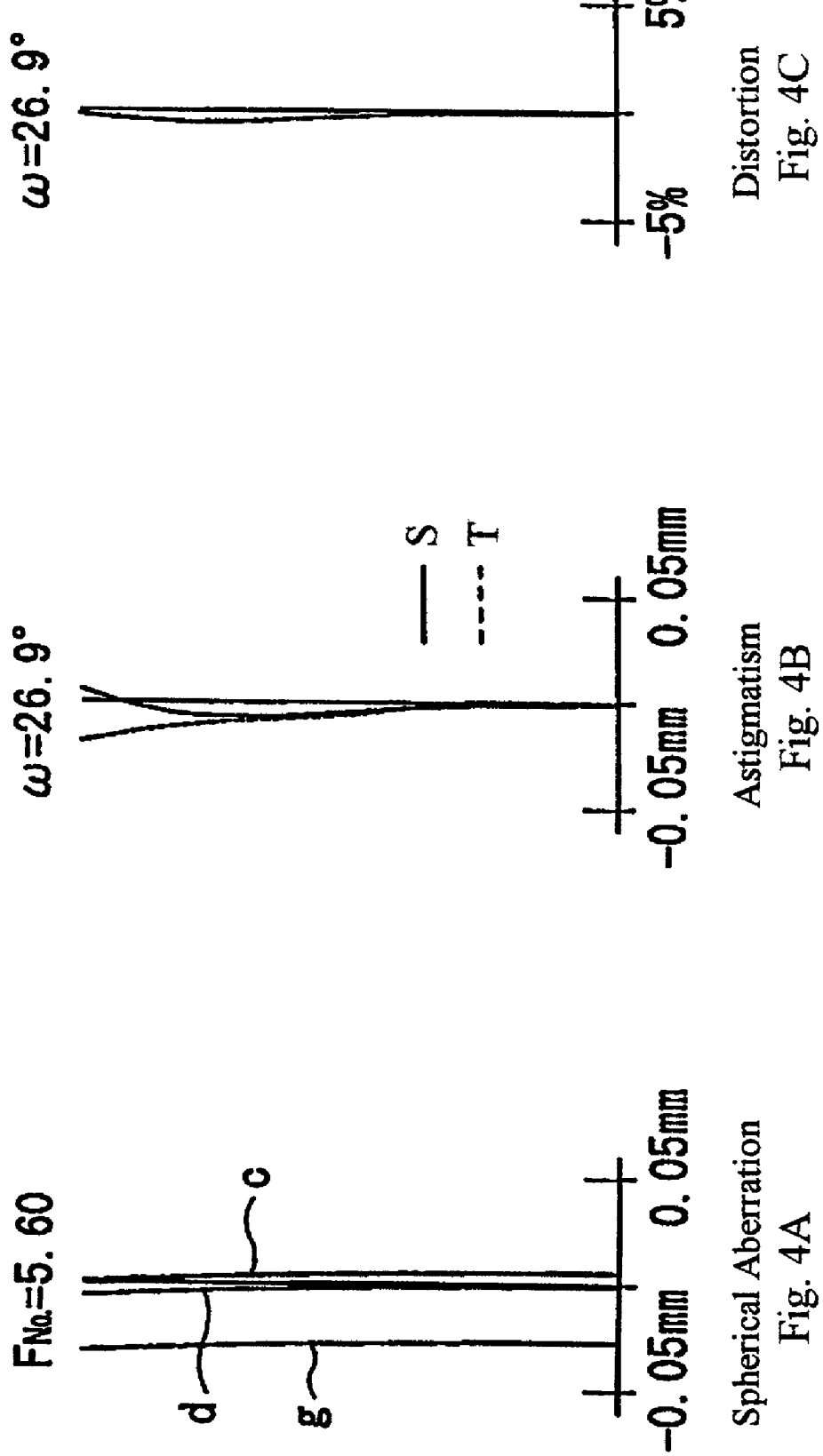

ELECTRONIC CAMERA

BACKGROUND OF THE INVENTION

Recently, electronic cameras which record the image of an object using a solid-state image pick-up device, such as a CCD (charge-coupled device) array instead of a silver salt film have been popularized. Generally, there are still cameras for picking up still images and video cameras for picking up dynamic images. Electronic cameras have a solid-state image pick-up device with many detecting elements, each corresponding to an image element, and these are arrayed two-dimensionally along a plane that is perpendicular to the optical axis of the optical system of the electronic camera.

In such electronic cameras, light is incident substantially normally onto the detecting elements that are positioned at the central part of the array surface. However, such cameras have had a problem of low light-detecting efficiency for light that is incident at the periphery of the array surface. The low light-detecting efficiency arises because the light at the periphery of the array surface is incident obliquely onto the detecting elements. Moreover, in many cases, the light-intercepting surface and the image plane of the detection elements arranged at the periphery of the array surface are not coincidental due to curvature of field of the optical system. Thus, another problem was that the image was out of focus at the periphery of the array surface. These problems have been solved previously by imposing strict restrictions on the design of the optical system for electronic cameras.

However, in response to recent demands for miniaturization of electronic still cameras, it is desirable to reduce restrictions, as far as possible, in the design of the optical system of electronic cameras. Therefore, it has been desired to improve the light-intercepting efficiency of the detecting elements of an electronic image pick-up device without imposing restrictions on the design of the optical system of electronic cameras.

BRIEF SUMMARY OF THE INVENTION

The present invention relates to electronic cameras, meaning cameras that employ electronic image pick-up devices for capturing images in lieu of recording the images using film.

The object of the present invention is to provide an electronic camera having improved light-intercepting efficiency of the detecting elements of the electronic image pick-up device without imposing restrictions on the design of the optical system.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4C show the spherical aberration, astigmatism, and distortion, respectively, of the lens illustrated in FIG. 3.

DETAILED DESCRIPTION

The present invention is an electronic camera that includes an electronic image pick-up device with multiple detecting elements which are arrayed on a surface, and an optical system which forms an image onto the multiple detecting elements. Whereas prior art electronic cameras imposed restrictions on the optical system in order to reduce curvature of field, and arrayed the optical elements on a planar surface that was normal to the optical axis of the optical system, the present invention imposes no restrictions on the curvature of field of the optical system, while improving optical detecting efficiency at the periphery of the image field by arranging the detecting elements on a curved surface. In this way light is normally incident onto the detecting elements of the electronic image pick-up device, even at the periphery of the image field. Further, whereas in prior art electronic cameras the light at the periphery of the image field was slightly out of focus due to residual curvature of field of the optical system, in the present invention the image remains in focus even at the perimeter of the image field.

Thus, in the electronic camera based on the present invention, light passing through the optical system is incident onto the image pick-up surface of the electronic image pick-up device. This surface has multiple detecting elements arranged on it, is a non-planar surface, and has a curvature that matches the curvature of field of the optical system.

It is preferable that the non-planar surface satisfies the following Condition (1):

$|R|<20\,f$            Condition (1)

where

R is the radius of curvature of the image pick-up surface, and f is the focal length of the optical system.

The invention will first be described in general terms.

Figure 1:
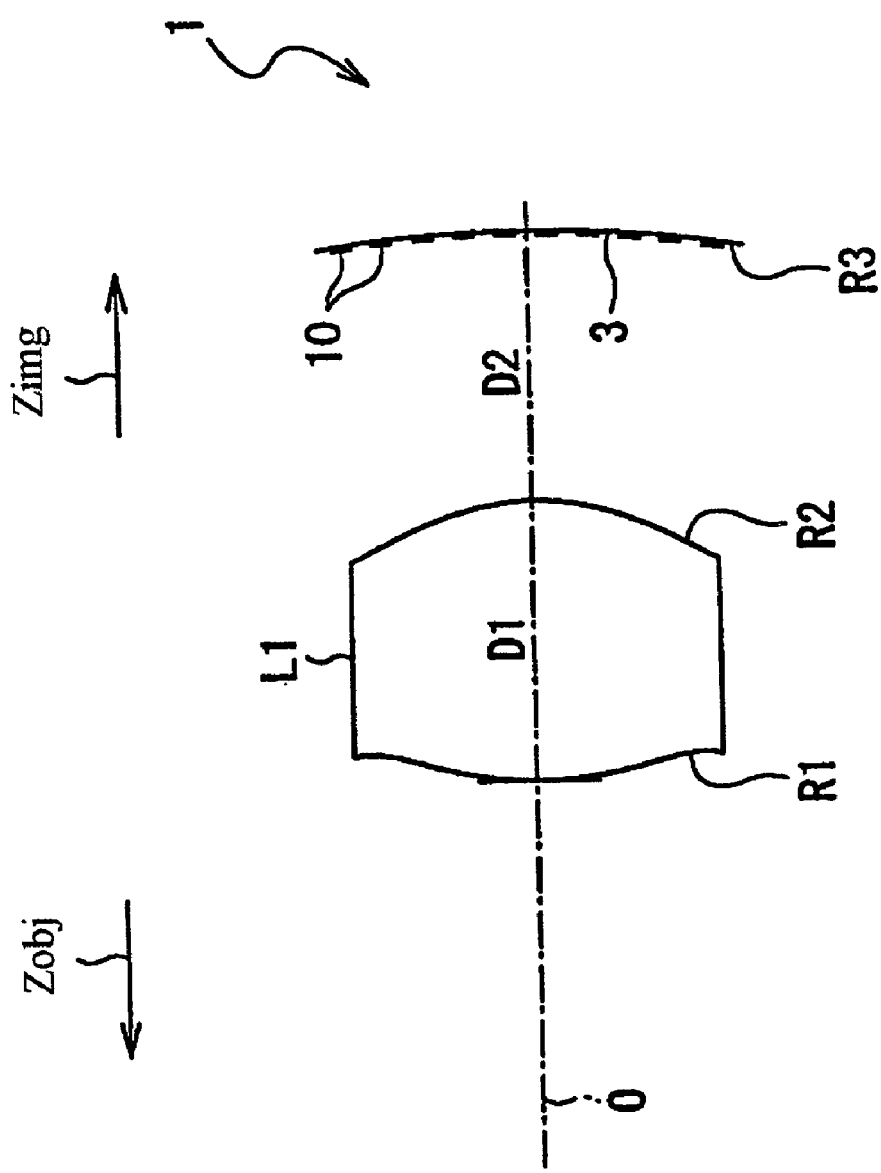
FIG. 1 is a sectional view showing the lens element configuration and optical detecting surface of an electronic camera relating to Embodiment 1 of the present invention.

FIG. 1 shows the construction of the optical system of an electronic camera relating to an embodiment of present invention. In FIG. 1, $Z_{OBJ}$ represents the object side, and $Z_{IMG}$ represents the image side. In FIG. 1, the symbols R1, R2 and R3 represent the radius of curvature of the first, second, and third surface, respectively, in order from the object side, the symbols D1 and D2 represent the on-axis spacing between the surfaces, in order from the object side, and the symbol 0 represents the optical axis.

The electronic camera shown in FIG. 1 is constructed using a biconvex lens L1 and an electronic image pick-up device 1. Both surfaces of the biconvex lens L1 are aspherical and satisfy the below Equation (A):

$$Z(h)=Ch^2/\{1+(1-KC^2h^2)^{1/2}\}+A_4h^4+A_6h^6+A_8h^8+A_{10}h^{10}$$    Equation (A)

where

Z is the length (in mm) of a line drawn from a point on the aspherical surface at distance h from the optical axis to the tangential plane of the aspherical surface vertex, $C$ $(=1/R)$ is the curvature of the aspherical surface near the optical axis, h is the distance (in mm) from the optical axis, K is the eccentricity, and $A_4$, $A_6$, $A_8$, and $A_{10}$ are the 4th, 6th, 8th, and 10th aspherical coefficients.

The electronic image pick-up device 1 is a solid-state image pick-up device, such as a CCD array, and multiple detecting elements 10 are arrayed along an array surface 3. The respective detecting elements 10 have a light-intercepting surface on the object side. The electronic image pick-up device 1 receives the light and obtains two-dimensional image information using the respective detecting elements 10.

The array surface 3 is non-planar. Preferably, the array surface 3 is concave on the object side. The array surface 3 may be formed on the surface of a support or other member (not illustrated).

By having the array surface 3 be non-planar, the angles of incidence of a light at the detecting elements 10 can be substantially normal, even at the periphery of the image field. This improves the light-intercepting efficiency of the detecting elements 10 of the electronic image pick-up device 1 without imposing any restrictions on the design of the optical system.

Further, focusing errors at the detecting elements can be suppressed because the array surface 3 is made to match the curvature of field of the optical system, which in this instance is the curvature of field of the lens L1.

Two specific embodiments of the invention will now be set forth in detail.

Embodiment 1

FIG. 1 shows the first embodiment of the invention. As this embodiment was discussed above in describing the invention in general terms, further explanation will be omitted.

Table 1 below lists the surface number #, in order from the object side, the radius of curvature R (in mm) near the optical axis, the on-axis spacing D (in mm) between surfaces, as well as the index of refraction $N_d$ and the Abbe number $\nu_d$ (both at the d-line) of the optical material of the lens of Embodiment 1 of a camera that uses a solid-state image detecting device. Those surfaces that are aspherical in Table 1 are listed with a * to the right of the surface number. In the middle portion of the table are listed the focal length f (the table data has been normalized, for convenience, so that f equals 1 mm), the f-number $F_{NO.}$, and the image angle $2\omega$. In the bottom portion of the table are listed the aspherical constants of the aspherical surfaces. These constants define the shape of the aspherical surfaces 1 and 2 according to Equation (A) above. An "E" in the data listed in the bottom portion of the table indicates that the number following the "E" is the exponent to the base 10. For example, "1.0E-02" represents the number $1.0 \times 10^{-2}$.

In the present embodiment, the radius of curvature R3 of the surface of the electronic image pick-up device 1 satisfies the above Condition (1), with the focal length f being that of the optical system formed by lens element L1.

Figure 2:
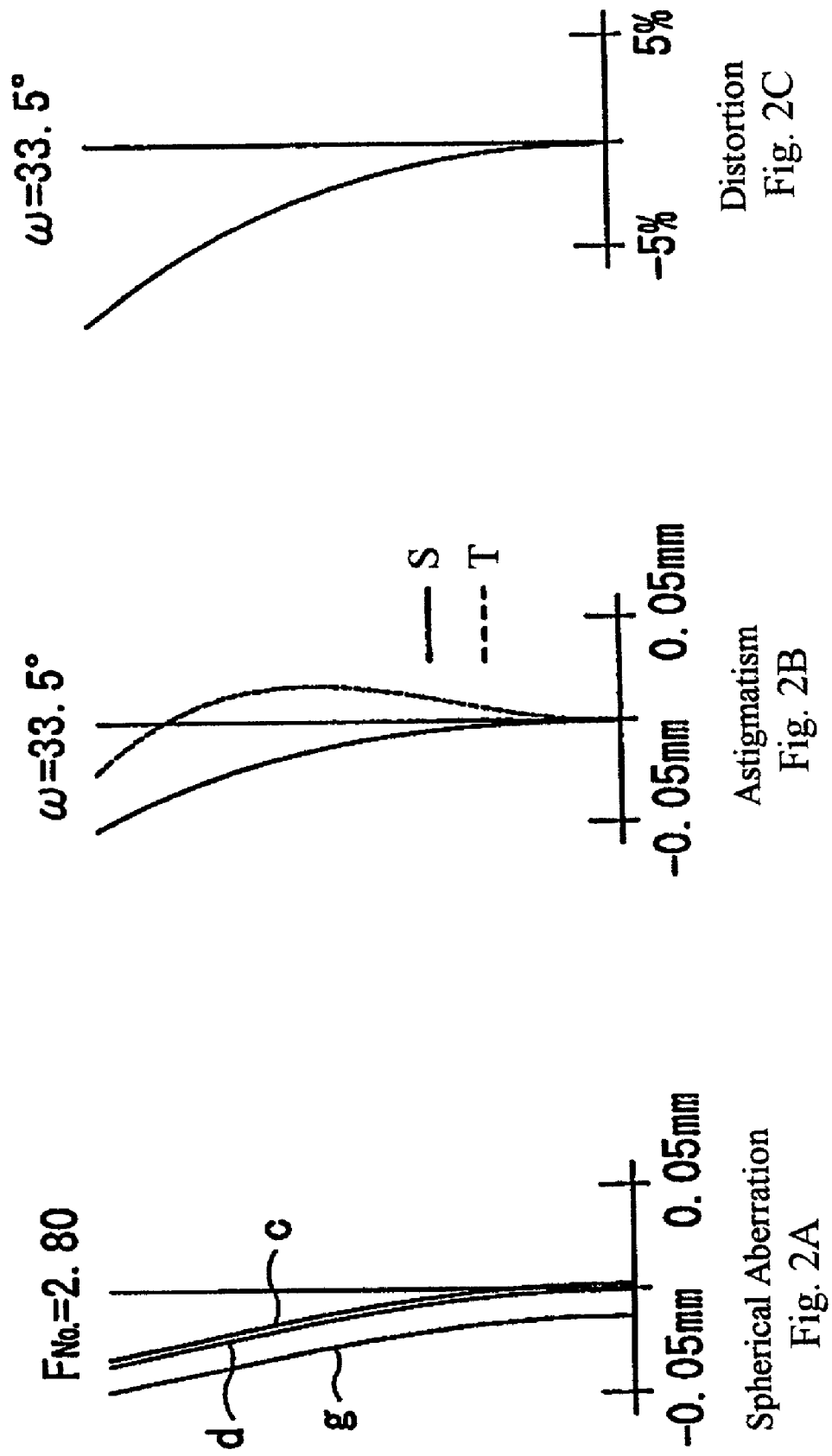
FIGS. 2A–2C show the spherical aberration, astigmatism, and distortion, respectively, of the lens illustrated in FIG. 1.

FIGS. 2A–2C show the spherical aberration, astigmatism, and distortion, respectively, of the optical system of the electronic camera of Embodiment 1. In FIG. 2A, curves are given for each of the c, d and g lines (i.e., at wavelengths 435.8 nm, 587.6 nm and 656.3 nm, respectively). In FIG. 2B, a solid line shows the astigmatism of the sagittal image surface S, and a broken line shows the astigmatism of the tangential image surface T. In these figures $F_{NO.}$ represents the f-number, and $\omega$ represents the half-image angle. As is apparent from the figures, the aberrations are favorably corrected.

Embodiment 2

Figure 3:
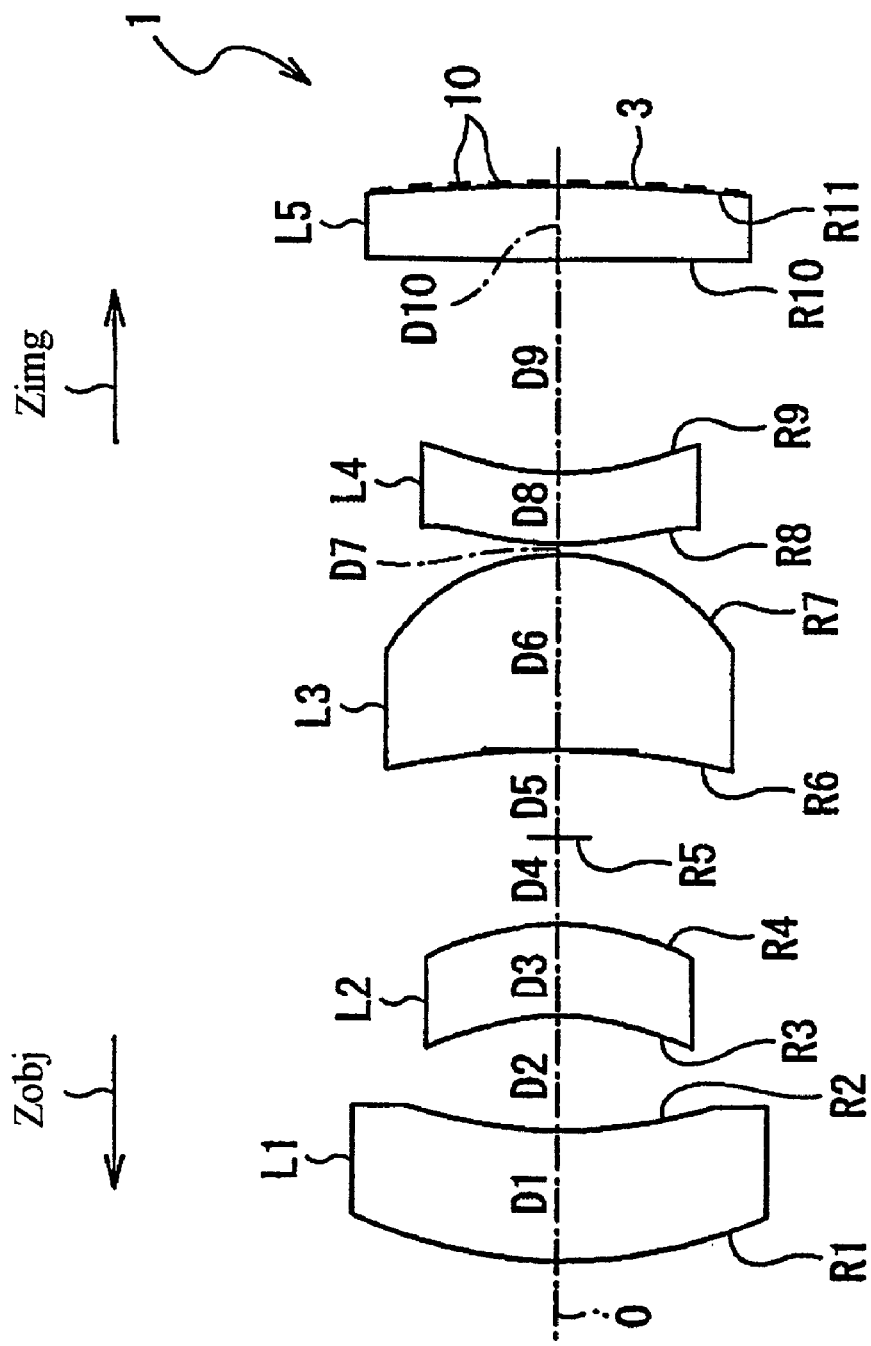
FIG. 3 is a sectional view showing the lens element configuration and optical detecting surface of an electronic camera relating to Embodiment 2 of the present invention.

FIG. 3 shows a second embodiment of the invention, with $Z_{OBJ}$ representing the object side, and $Z_{IMG}$ representing the image side. The symbols R1–R11 represent the radius of curvature of the surfaces of the optical elements, in order from the object side, the symbols D1–D10 represent the on-axis spacing between the surfaces, in order from the object side, and the symbol 0 represents the optical axis.

As shown in FIG. 3, the electronic camera relating to the present embodiment is provided with a first lens element L1 of positive meniscus shape with its convex surface on the object side, a second lens element L2 of negative meniscus shape with its convex surface on the image side, a third lens element L3 of positive meniscus shape with its convex surface on the image side, a fourth lens element L4 of negative meniscus shape with its convex surface on the object side, and a fifth lens element L5 having a planar surface on the object side and a convex surface on the image side. Both surfaces of each of the second lens element L2 and the fourth lens element L4 are aspherical.

The array surface 3 containing multiple detecting elements 10 of an electronic image pick-up device 1 is mounted to the image-side surface (i.e., surface #11, in order from the object side) of the fifth lens element L5.

Table 2 below lists the surface number #, in order from the object side, the radius of curvature R (in mm) near the optical axis, the on-axis spacing D (in mm) between surfaces, as well as the index of refraction $N_d$ and the Abbe number $\nu_d$ (both at the d-line) of the optical materials of the lens of Embodiment 2 of a camera that uses a solid-state image detecting device. Those surfaces that are aspherical in Table 2 are listed with a * to the right of the surface number. In the middle portion of the table are listed the focal length f (the table data has been normalized, for convenience, so that f equals 1 mm), the f-number $F_{NO.}$, and the image angle

TABLE 1

| # | R | D | $N_d$ | $\nu_d$ |
|---|---|---|---|---|
| 1* | 1.1300 | 0.80662 | 1.49700 | 81.6 |
| 2* | −0.6769 | 0.76302 | | |
| 3 | −3.7642 | 0.0000 | | |

| f = 1.00 | $F_{NO.}$ = 2.8 | $2\omega$ = 67.1° |

| # | K | $A_4$ | $A_6$ | $A_8$ | $A_{10}$ |
|---|---|---|---|---|---|
| 1 | 0.5125 | 3.3751E − 01 | −3.8136 | −1.4285E − 02 | 2.0606E − 02 |
| 2 | −0.1136 | 4.1294E − 01 | −1.1224E − 01 | −1.7612E − 01 | −1.4666E − 02 |

2ω. In the bottom portion of the table are listed the aspherical constants of the aspherical surfaces. These constants define the shape of the aspherical surfaces (i.e. surface numbers 3, 4, 8 and 9) according to Equation (A) above. An "E" in the data listed in the bottom portion of the table indicates that the number following the "E" is the exponent to the base 10. For example, "1.0E-02" represents the number $1.0 \times 10^{-2}$.

TABLE 2

| # | R | D | $N_d$ | $v_d$ |
|---|---|---|---|---|
| 1 | 1.3172 | 0.3470 | 1.92286 | 21.3 |
| 2 | 1.3758 | 0.3019 | | |
| 3* | −0.5444 | 0.2384 | 1.50848 | 56.4 |
| 4* | −0.5631 | 0.2293 | | |
| 5 | 0.0000 | 0.2293 | | |
| 6 | −1.9866 | 0.5191 | 1.65160 | 58.5 |
| 7 | −0.5350 | 0.0306 | | |
| 8* | 1.0153 | 0.1834 | 1.50848 | 56.4 |
| 9* | 0.8369 | 0.5564 | | |
| 10 | 0.0000 | 0.1987 | 1.51680 | 64.2 |
| 11 | −4.5861 | | | |

| | f = 1.00 | | $F_{No.}$ = 5.6 | | 2ω = 54.0° | |
|---|---|---|---|---|---|---|

| # | K | $A_4$ | $A_6$ | $A_8$ | $A_{10}$ |
|---|---|---|---|---|---|
| 3 | 1.9583 | 4.2589 | −1.3839E − 02 | 2.9167E + 01 | −4.9631E + 01 |
| 4 | −0.7064 | 2.6072 | 1.4847E − 01 | −1.4001E + 02 | 7.4866E + 01 |
| 8 | −3.8076 | 9.8739E − 01 | −1.4064E + 01 | −1.1646E + 01 | 1.6638E + 01 |
| 9 | −3.0230 | 2.6965 | −2.1772E + 01 | 1.9202E + 01 | 7.9036E + 01 |

In the present embodiment, the radius of curvature R11 of the surface of the electronic image pick-up device 1 satisfies the above Condition (1), with the focal length f being that of the optical system formed by lens elements L1 through L5.

FIGS. 4A–4C show the spherical aberration, astigmatism, and distortion, respectively, of the optical system of the electronic camera of the Embodiment 2. In FIG. 4A, curves are given for each of the c, d and g lines (i.e., at wavelengths 435.8 nm, 587.6 nm and 656.3 nm, respectively). In FIG. 4B, a solid line shows the astigmatism of the sagittal image surface S, and a broken line shows the astigmatism of the tangential image surface T. In these figures $F_{NO.}$ represents the f-number, and ω represents the half-image angle. As is apparent from the figures, the aberrations are favorably corrected.

The invention being thus described, it will be obvious that the same may be varied in many ways. For example, values of the radius of curvature R of array surface 3, as well as the radii of curvature and spacings D of the lens element surfaces can be readily modified by those of ordinary skill in the art to obtain a system of a desired focal length. Further, the optical materials of the lens components may be varied from those illustrated in the specific embodiments. Still further, it is not entirely necessary that the detecting elements be arranged in a two-dimensional array. For example, for certain applications, one could instead employ a linear array of detecting elements with a desired curvature that matches the curvature of field of the optical system and rotate the image field by using, for example, a rotating prism so as to read-out, in timed sequence, the image data. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An electronic camera that includes an optical system for forming an image of an object, and an electronic image pick-up device for capturing image information by arranging multiple detecting elements on an image pick-up surface wherein:

the optical system includes, in order from the object side, a first lens element of positive meniscus shape, a second lens element of negative meniscus shape, a third lens element of positive meniscus shape, a fourth lens element of negative meniscus shape, and a fifth lens element having a planar surface on the object side; and said image pick-up surface is non-planar and corresponds in shape to the curvature of field of said optical system.

2. The electronic camera described in claim 1, wherein said image pick-up surface has a radius of curvature which satisfies the following condition:

|R|<20 f where

R is the radius of curvature of the image pick-up surface, and f is the focal length of the optical system.

3. The electronic camera of claim 1, wherein the first lens element has its convex surface on the object side.

4. The electronic camera of claim 1, wherein the second lens element has its convex surface on the image side.

5. The electronic camera of claim 1, wherein the third lens element has its convex surface on the image side.

6. The electronic camera of claim 1, wherein the fourth lens element has its convex surface on the object side.

7. The electronic camera of claim 1, wherein the fifth lens element has a convex surface on the image side.

8. The electronic camera of claim 1, wherein the first lens element has its convex surface on the object side and the second lens element has its convex surface on the image side.

9. The electronic camera of claim 8, wherein the third lens element has its convex surface on the image side.

10. The electronic camera of claim 9, wherein the fourth lens element has its convex surface on the object side.

11. The electronic camera of claim 10, wherein the fifth lens element has a convex surface on the image side.

* * * * *

UNITED STATES PATENT AND TRADEMARK OFFICE
CERTIFICATE OF CORRECTION

PATENT NO. : 6,985,184 B2
DATED : January 10, 2006
INVENTOR(S) Sato

It is certified that error appears in the above-identified patent and that said Letters Patent is hereby corrected as shown below:

Column 2,
Lines 56 and 57, change the equation to:
-- $Z(h) = Ch^2/\{1+(1-KC^2h^2)^{1/2}\}+A_4h^4+A_6h^6+A_8h^8+A_{10}h^{10}$  ... Equation (A) --.

Signed and Sealed this

Eighteenth Day of April, 2006

JON W. DUDAS
*Director of the United States Patent and Trademark Office*